US007969042B2

(12) United States Patent
Corum et al.

(10) Patent No.: US 7,969,042 B2
(45) Date of Patent: Jun. 28, 2011

(54) APPLICATION OF POWER MULTIPLICATION TO ELECTRIC POWER DISTRIBUTION

(75) Inventors: James F. Corum, Morgantown, WV (US); Philip Pesavento, Morgantown, WV (US)

(73) Assignee: CPG Technologies, LLC, Newbury, OH (US)

( * ) Notice: Subject to any disclaimer, the term of this patent is extended or adjusted under 35 U.S.C. 154(b) by 731 days.

(21) Appl. No.: 11/751,343

(22) Filed: May 21, 2007

(65) Prior Publication Data

US 2008/0185916 A1 Aug. 7, 2008

Related U.S. Application Data

(63) Continuation-in-part of application No. 11/670,620, filed on Feb. 2, 2007, and a continuation-in-part of application No. 11/697,014, filed on Apr. 5, 2007.

(60) Provisional application No. 60/910,423, filed on Apr. 5, 2007.

(51) Int. Cl.
H02J 3/38 (2006.01)
(52) U.S. Cl. ............... 307/43; 307/44; 307/47
(58) Field of Classification Search .......... 307/43, 307/44, 47
See application file for complete search history.

(56) References Cited

U.S. PATENT DOCUMENTS

| 2,875,415 | A | * | 2/1959 | Sferrazza | 324/629 |
|---|---|---|---|---|---|
| 3,012,203 | A | | 12/1961 | Ping | |
| 3,300,728 | A | | 1/1967 | Adler | |
| 3,435,342 | A | | 3/1969 | Burnsweig et al. | |
| 3,501,164 | A | | 3/1970 | Peterson | |
| 3,631,534 | A | | 12/1971 | Hirota et al. | |
| 3,663,948 | A | | 5/1972 | Nagae et al. | |
| 3,771,077 | A | | 11/1973 | Tischer | |
| 3,829,881 | A | | 8/1974 | Kohashi | |
| 4,009,444 | A | * | 2/1977 | Farkas et al. | 315/5.13 |
| 4,467,269 | A | | 8/1984 | Barzen | |
| 4,622,558 | A | | 11/1986 | Corum | |
| 4,749,950 | A | | 6/1988 | Farkas | |
| 4,751,515 | A | | 6/1988 | Corum | |
| 5,406,237 | A | | 4/1995 | Ravas et al. | |
| 5,633,648 | A | | 5/1997 | Fischer | |
| 5,748,295 | A | | 5/1998 | Farmer | |
| 5,949,311 | A | | 9/1999 | Weiss et al. | |
| 6,107,697 | A | * | 8/2000 | Markelov | 307/43 |

(Continued)

FOREIGN PATENT DOCUMENTS

CA 1186049 4/1985

(Continued)

OTHER PUBLICATIONS

Adler, R.B., L.J. Chu, and R.M. Fano, *Electromagnetic Energy Transmission and Radiation*, Wiley, 1960, p. 31-32.

(Continued)

*Primary Examiner* — Jared J Fureman
*Assistant Examiner* — Hal I. Kaplan
(74) *Attorney, Agent, or Firm* — Thomas, Kayden, Horstemeyer & Risley, LLP

(57) ABSTRACT

In various embodiments, various systems and methods are provided for power distribution. In one embodiment, power distribution apparatus is provided comprising a power multiplier comprising a multiply-connected electrical structure, and a plurality of power network couplings in the multiply-connected electrical structure. The multiply-connected electrical structure is a resonant circuit tuned to a nominal frequency of a power network.

33 Claims, 4 Drawing Sheets

U.S. PATENT DOCUMENTS

| | | | | |
|---|---|---|---|---|
| 6,121,693 | A * | 9/2000 | Rock | 307/18 |
| 6,459,247 | B1 | 10/2002 | Benes | |
| 6,522,030 | B1 * | 2/2003 | Wall et al. | 307/43 |
| 6,611,181 | B2 | 8/2003 | Marketkar et al. | |
| 6,653,821 | B2 * | 11/2003 | Kern et al. | 322/7 |
| 6,653,827 | B2 | 11/2003 | Gaither et al. | |
| 6,654,216 | B2 | 11/2003 | Horvath et al. | |
| 6,788,163 | B2 | 9/2004 | Benham et al. | |
| 6,990,327 | B2 | 1/2006 | Zheng et al. | |
| 7,033,406 | B2 | 4/2006 | Weir et al. | |
| 7,050,913 | B2 | 5/2006 | Cox | |
| 7,583,143 | B2 | 9/2009 | Pan | |
| 2002/0149535 | A1 | 10/2002 | Toncich | |
| 2006/0190512 | A1 | 8/2006 | Corum | |
| 2006/0190513 | A1 | 8/2006 | Corum | |
| 2006/0212176 | A1 * | 9/2006 | Corum | 700/295 |
| 2008/0186646 | A1 | 8/2008 | Corum | |

FOREIGN PATENT DOCUMENTS

| | | |
|---|---|---|
| EP | 0043591 | 1/1982 |
| SE | 152491 | 11/1955 |

OTHER PUBLICATIONS

Collin, R.E., Foundations for Microwave Engineering, McGraw-Hill, 1966, pp. 80-89, 144-197.

Corum, J.F. and K.L. Corum, "RF Coils, Helical Resonators and Voltage Magnification by Coherent Spatial Modes," Microwave Review, Sep. 2001, pp. 36-45.

Corum, J.F., "A Concentric Array For Low and Medium Frequencies," 1990 IEEE Antennas and Propagation Society International Symposium Digest, Dallas, Texas, May 1990, vol. 2, pp. 832-835.

Corum, J.F., "A Novel Structure For Improved Directivity," Proceedings of the 1988 IEEE Antennas and Propagation Society International Symposium, Syracuse, New York, Jun. 1988, pp. 824-827.

Corum, J.F., "Experimental Validation of the Improved Directivity Element—Elevation Plane Control," Proceedings of the 1989 IEEE Antennas and Propagation Society International Symposium, San Jose, California, 1989, pp. 702-705.

Corum, J.F., "Toroidal Helix Antenna," Proceedings of the 1987 IEEE Antennas and Propagation Society International Symposium, Blacksburg, Va., Jun. 1987, pp. 832-835).

Corum, J.F., "Vehicular Wide-Band Antenna System," Tactical Warfare Simulation and Technology Information Analysis Center, Battelle Memorial Institute, Final Report, US Army Missile Command Contract No. DAAH01-91-D-R006, Jun. 30, 1993, pp. 1-41.

Corum, J.F., B.F. Pinzone, and K.L. Corum, "A New Low Profile AntiSkywave Antenna for AM Broadcasting," Proceedings of the 1988 National Association of Broadcasters (NAB) 42nd Engineering Conference, Las Vegas, Nevada, Apr. 1988, pp. 7-15.

Corum, J.F., B.F. Pinzone, and K.L. Corum, "Antiskywave Antenna Design," Radio World, May 15, 1988, pp. 45-46.

Corum, K.L. and J.F. Corum, "Tesla and the Magnifying Transmitter," Proceedings of the 1992 International Tesla Symposium, International Tesla Society, 1992, pp. 55-78.

IEEE Standard Dictionary of Electrical and Electronics Terms, McGraw-Hill, second edition, 1977, p. 391.

Johnson, W.C., Transmission Lines and Networks, McGraw-Hill, 1950, pp. 117-120.

Nourai, A. "Comparison of the Costs of Energy Storage Technologies for T&D Applications", American Electric Power, downloaded from www.electricitystorage.org, Jul. 2004, pp. 1-30.

Paris, D.T. and F.K. Hurd, Basic Electromagnetic Theory, McGraw-Hill, 1969, pp. 512-527.

Terman, F.E., Radio Engineering Handbook, McGraw-Hill, 1943, pp. 172-178, 191-215.

Statement Submitted under 37 CFR §1.56 (8 pages) with Attached Declaration of Dr. James F. Corum (4 pages), Dec. 2009.

Alexanderson, E.F.W., "A Magnetic Amplifier for Radio Telephony," Proceedings of the IRE, vol. 4, Apr. 1916, pp. 101-120.

Balakin, A. B., "A new approach to the detection of gravitational waves," American Institute of Physics, pp. 183-184, Feb. 1991.

Barrow, W.L., "Frequency Modulation and the Effects of a Periodic Capacity Variation in a Nondissipative Oscillatory Circuit," Proc. IRE, vol. 21, 1933, pp. 1182-1202.

Barrow, W.L., "On the Oscillations of a Circuit Having a Periodically Varying Capacitance," Proc. IRE, vol. 22, 1934, pp. 201-212.

Barrow, W.L., D.B. Smith and F.W. Baumann, "A Further Study of Oscillatory Circuits Having Periodically Varying Parameters—Part I," Jour. Franklin Institute, vol. 221, 1936, pp. 403-416.

Barrow, W.L., D.B. Smith and F.W. Baumann, "A Further Study of Oscillatory Circuits Having Periodically Varying Parameters—Part II," Jour. Franklin Institute, vol. 221, 1936, pp. 509-529.

Beckman, P., "Einstein Plus Two," The Golem Press, CO, Chapter 1.12, "Radiation and Some Other Matters", pp. 156-162, 1987.

Benahmend, N. et al., "Finite Element Analysis of RF Couplers with Sliced Coaxial Cable," Microwave Journal, pp. 106, 113-114, 116, 118, 120, Nov. 2000.

Bennett, W.R., "A General Review of Linear Varying Parameter and Nonlinear Circuit Analysis," Proc. IRE, vol. 38, 1950, pp. 259-263.

Bennett, W.R., "Amplification in Nonlinear Reactive Networks," IRE Transactions on Circuit Theory, vol. CT-7, Dec. 1960, pp. 440-446.

Blair, D.G., et al, "High Sensitivity Gravitational Wave Antenna with Parametric Transducer Readout," Phys. Rev. Letters, vol. 74, Mar. 13, 1995, pp. 1908-1911.

Bloom, S. and K.K.N. Chang, "Parametric Amplification Using Low-Frequency Pumping," Journal of Applied Physics, vol. 29, 1958, p. 594.

Bloom, S., and K.K.N. Chang, "Theory of Parametric Amplification Using Nonlinear Reactances," RCA Review, vol. 18, Dec. 1957, pp. 578-593.

Carlson, A.B., Communication Systems, McGraw-Hill, second edition, 1975, p. 187-188.

Chiang, Yi-Chyun, et al., "Design of a Wide-Band Lumped-Element 3-dB Quadrature Coupler," IEEE Transactions on Microwave Theory and Techniques, pp. 476-479, Mar. 2001.

Corum, J.F., "The Electromagnetic Stress-Tensor As A Possible Space Drive Propulsion Concept," 37th AIAA/ASME/SAE/ASEE JPC Conference and Exhibit, Salt Lake City, Utah, Jul. 2001, pp. 1-11.

Cullen, A.L., "A Traveling Wave Parametric Amplifier," Nature, vol. 181, Feb. 1, 1958, p. 332.

Cunningham, W.J., Nonlinear Systems, McGraw-Hill, 1958, pp. 259-280.

Faraday, M., "On a Peculiar Class of Acoustical Figures; and on Certain Forms Assumed by a Group of Particles upon Vibrating Elastic Surfaces," Philosophical Transactions of the Royal Society, London, vol. 121, May 1831, pp. 299-340.

Franke, E., "Capacitively Coupled Hybrids," Ham Radio, pp. 70-78, Mar. 1983.

Gorelik, G., Resonance Phenomena in Linear Systems With Periodic Parameters, Technical Physics of the USSR, Leningrad, 1935, vol. 2, No. 2-3, pp. 135-180.

Hartley R.V.L., "Oscillations with Non-linear Reactances," Bell System Technical Journal, vol. 15, No. 3, Jul. 1936, pp. 424-440.

Hayes, P.S. and R.A. Surette, "Methods of Producing High Levels of RF Power for Test Purposes," Proceedings of the 1988 National Association of Broadcasters (NAB) 42nd Engineering Conference, Las Vegas, Nevada, Apr. 1988, pp. 380-386.

Hussey, L.W. and Wrathall, L.R., "Oscillations in an Electromechanical System," Bell System Technical Journal, vol. 15, No. 3, Jul. 1936, pp. 441-445.

Karasev, M.D., "Some General Properties of Nonlinear Reactive Elements," Soviet Physics Uspekhi, vol. 67 (2), No. 5, Oct. 1959, pp. 719-748.

Kharkevich, A.A., Nonlinear and Parametric Phenomena in Radio Engineering, translated by J.G. Adashko, John F. Rider Publishers, 1962, pp. 166-176.

Kuecken J. A, "Antennas and Transmission Lines," Howard W. Sams & Co., New York, Chapter 23, pp. 149-159, 1969.

Landon, V.D., "The Use of Ferrite-Cored Coils as Converters, Amplifiers, and Oscillators," RCA Review, vol. 10, 1949, pp. 387-396.

Lazarev, V.A., "On Hetero-Parametric Excitation," Zhurnal Teknicheskoi Fiziki, vol. 3, 1934, pp. 30-48 (Translation by Peter J. Pesavento available on the internet at http://nedyn.com/translations.html).

Lombardo, P.P., and E.W. Sard, "Low Frequency Prototype Traveling-Wave Reactance Amplifier," Proceedings of the IRE, vol. 47, 1959, pp. 990-1005.

Lord Rayleigh (J.W. Strutt), "On the Crispations of Fluid Resting upon a Vibrating Support," Phil. Mag., vol. 16, 1883, pp. 50-58.

Lord Rayleigh, (J.W. Strutt), "On the Maintenance of Vibrations by Forces of Double Frequency, and on the Propagation of Waves Through a Medium Endowed with a Periodic Structure," Phil. Mag., vol. 24, #147, Aug. 1887, pp. 145-159.

Lord Rayleigh, (J.W. Strutt), Theory of Sound, Macmillan, 2nd edition, 1894, vol. 1, pp. 76-85.

Louisell, W.H., Coupled Mode and Parametric Electronics, Wiley, 1960, p. 92-147.

Mandelstam, L., N. Papalexi, A. Andronov, S. Chaikin and A. Witt, "Report on Recent Research on Nonlinear Oscillations," Technical Physics of the USSR, Leningrad, vol. 2 No. 2-3, 1935, pp. 81-135. (Translation by Philip V. Pesavento available on the internet at http://nedyn.com/Mandelstam.html).

Mandelstam, L.I. and and N. Papalexi, "Oscillations in an Electrical System Energized by Means of Periodically Varying Capacitances," Zhurnal Teknicheskoy Fiziki, vol. 3, No. 7, 1933, pp. 1-6. (Translation by Peter J. Pesavento, available on the internet at: http://nedyn.com/translations.html).

Mandelstam, L.I. and N. Papalexi, "On the Parametric Excitation of Electric Oscillations," Zhurnal Teknicheskoy Fiziki, vol. 4, No. 1, 1934, pp. 1-47. [Translation UCRL-Trans-10231, Univ. of Calif., Lawrence Radiation Laboratory, Livermore, CA, Feb. 1968. Recent copy available at: http://nedyn.com/translations.html].

Manley, J.M. and E. Peterson, "Negative Resistance Effects in Saturable Reactor Circuits," AIEE Transactions, vol. 65, Dec. 1946, pp. 870-881.

Manley, J.M. and H.E. Rowe, "Some General Properties of Nonlinear Elements—Part I. General Energy Relations," Proceedings of the IRE, vol. 44, 1956, pp. 904-913.

Manley, J.M., "Some General Properties of Magnetic Amplifiers," Proceedings of the IRE, vol. 39, Mar. 1951, pp. 242-251.

Manley, J.M., "Some Properties of Time Varying Networks," IRE International Convention Record, vol. 8, Pt. 2, 1961, pp. 69-78.

Matthaei, G.L., L. Young, and E.M.T. Jones, Microwave Filters, Impedance Matching Networks, and Coupling Structures, McGraw-Hill, 1964, Chapter 14. See pp. 843-887.

McWhorter, M., "Broadband RF Transformer Directional Couplers," RF Design, pp. 53-58, Jul. 1991.

Meers, B. J., "Recycling in laser-interferometric gravitational-wave detectors," The American Physical Society, vol. 38, No. 8, pp. 2317-2326, Oct. 1988.

Miller, S.J., "The Traveling Wave Resonator and High Power Microwave Testing," Microwave Journal, Sep. 1960, pp. 50-58.

Milosevic, L. J., et al., "Traveling-Wave Resonators," IRE Transactions on Microwave Theory and Techniques, pp. 136-143, Apr. 1958.

Minorsky, N., "On Parametric Excitation," Journal of the Franklin Institute, vol. 240, 1945, pp. 25-46.

Minorsky, N., Nonlinear Oscillations, Van Nostrand, 1962, pp. 464-469, 488-509.

Minorsky, N., "Parametric Excitation," Journal of Applied Physics, vol. 22, No. 1, California, Jan. 1951, pp. 49-54.

Mumford, W.W., "Some Notes on the History of Parametric Transducers," Proceedings of the IRE, vol. 48, Issue 5, May 1960, pp. 848-853.

Nergaard, L.S., "Nonlinear Capacitance Amplifiers," RCA Review, vol. 20, 1959, pp. 3-17.

Oliver, B. M., "Directional Electromagnetic Couplers," Proceedings of the I-R-E, pp. 1686-1692, Nov. 1954.

Page, C.H., "Frequency Conversion with Nonlinear Reactance," Journal of Research of the National Bureau of Standads, vol. 58, May 1957, pp. 227-236.

Peterson, E., "Atomic Physics and Circuit Theory," Bell Laboratories Record, vol. 7, No. 2, Feb. 1929, pp. 231-233.

Raab, F. J., "Recycling for a cleaner signal," Nature, vol. 351, pp. 98-100, May 1991.

Raskin, J.P., A.R. Brown, B.T. Khuri-Yakub, and G.M. Rebeiz, "A Novel Parametric-Effect MEMS Amplifier," IEEE Jour. of Microelectromechanical Systems, vol. 9, Dec. 2000, pp. 528-537.

Roe, GM., and M.R. Boyd, "Parametric Energy Conversion in Distributed Systems," Proc. IRE, vol. 47, 1959, pp. 1213-1218.

Rowe, H.E., "Some General Properties of Nonlinear Elements—Part II. Small Signal Theory," Proceedings of the IRE, vol. 46, 1958, pp. 850-860.

Schwarzkopf, D.B., "The Traveling Wave Resonator as a Short Pulse Generator," Microwave Journal, Oct. 1962, pp. 172-180.

Sferrazza, P.J., "A Traveling Wave Resonator," Proceedings of the National Electronics Conference, vol. 2, 1955, pp. 968-973.

Somlo, P.I., "Some Aspects of the Measurement of the Q Factor of Transmission Lines," IEEE Transactions on Microwave Theory and Techniques, pp. 472-478, Nov. 1963.

Strain, K. A., et al., "Experimental Demonstration of Dual Recycling for Interferometric Gravitational-Wave Detectors," Physical Review Letters, The American Physical Society, vol. 66, No. 11, pp. 1391-1394, Mar. 1991.

Suhl, H., "A Proposal for a Ferromagnetic Amplifier in the Microwave Range," Physical Review, vol. 106, Apr. 15, 1957, pp. 384-385.

Suhl, H., "Theory of the Ferromagnetic Amplifier," Journal of Applied Physics, vol. 28, Nov. 1957, pp. 1225-1236.

Tez, E.S., and Smith, I.R., "The Parametric Transformer: A Power Conversion Device Demonstrating the Principles of Parametric Excitation," IEEE Transactions on Education, vol. E-27, No. 2, May 1984, Loughborough, England, pp. 56-65.

Tien, P.K., "Parametric Amplification and Frequency Mixing in Propagating Circuits," Journal of Applied Physics, vol. 29, 1958, pp. 1347-1357.

Tien, P.K., and H. Suhl, "A Traveling Wave Ferromagnetic Amplifier," Proc. IRE, vol. 46, 1958, pp. 700-706.

Tischer, F.J., "Resonance Properties of Ring Circuits," IEEE Transactions on Microwave Theory and Techniques, vol. MTT-5, 1957, pp. 51-56.

Tomiyasu, K., "Attenuation in a Resonant Ring Circuit," IEEE Transactions on Microwave Theory and Techniques, vol. MTT-8, 1960, pp. 253-254.

Tomiyasu, K., "Effect of a Mismatching Ring in a Traveling-Wave Resonant Circuit," G. E. Microwave Lab, p. 267, Sep. 1957.

Valdes, L.B., Circuit Conditions for Parametric Amplification, General Electric Microwave Laboratory, Palo Alto, California, May 1958, pp. 129-141.

Van der Zeil, A., "On the mixing Properties of Nonlinear Condensers," Journal of Applied Physics, vol. 19, 1948, pp. 999-1006.

Vinet J. Y., et al., "Optimization of Long-Baseline Optical Interferometers for Gravitational-wave Detection," The American Physical Society, vol. 38, No. 2, pp. 433-447, Jul. 1988.

Weiss, M.T., "A Solid State Microwave Amplifier and Oscillator Using Ferrites," Physical Review, vol. 107, Jul. 1957, p. 317.

Weiss, M.T., "Quantum Derrivation of Energy Relations Analogous to those for Nonlinear Reactances," Proceedings of the IRE, vol. 45, Jul. 1957, pp. 1012-1025.

Winter-Gunther, H., "Self-Excitation of Systems with Periodically Varying Inductances," Jahrbuch der drahtlosen Telegraphie und Telephonie, vol. 37, No. 2, 1931, pp. 172-174 (pp. 1-6 as translated).

Winter-Gunther, H., "On Self-Excitated Oscillations in Circuits with Iron-Core Coils," Jahrbuch der drahtlosen Telegraphie und Telephonie, vol. 34, No. 2, 1929, pp. 41-49 (pp. 1-18 as translated).

Young, L., "A Hybrid-Ring Method of Simulating Higher Powers than are Available in WaveGuides," Radio Section, Paper No. 1643, 1954.

International Search Report and Written Opinion for International Application No. PCT/US06/04324 mailed on Jun. 22, 2007.

International Search Report and Written Opinion for International Application No. PCT/US06/04522 mailed on Jun. 31, 2007.

International Search Report and Written Opinion for International Application No. PCT/US08/52387 mailed on Jul. 14, 2008.

International Search Report and Written Opinion for International Application No. PCT/US08/59414 mailed on Aug. 15, 2008.

* cited by examiner

APPLICATION OF POWER MULTIPLICATION TO ELECTRIC POWER DISTRIBUTION

CROSS-REFERENCE TO RELATED APPLICATION

This application is a continuation-in-part of co-pending U.S. Utility patent application Ser. No. 11/670,620 entitled, "PARAMETRIC POWER MULTIPLICATION," filed on Feb. 2, 2007, which is incorporated herein by reference in its entirety. This application is also a continuation-in-part of co-pending U.S. Utility patent application Ser. No. 11/697,014 entitled "ELECTRIC POWER STORAGE," filed on Apr. 5, 2007, which is incorporated herein by reference in its entirety. This application claims priority to U.S. Provisional Patent Application No. 60/910,423 entitled "Applications for Power Multipliers" filed on Apr. 5, 2007, which is incorporated herein by reference in its entirety.

BACKGROUND

There are many problematic issues related to utility power distribution networks. For example, typical utility power distribution networks create harmonics that can damage equipment such as transformers and the like. Specifically, harmonics generated in a power distribution network can become attenuated in transformers and other components, causing the generation of heat that ultimately results in the premature failure of transformers or other components.

In current electrical distribution systems such as the North American power grid it is often the case that Utilities experience severe mismatches between peak and average load demands. This can result in brown outs and blackouts in the system. Also, the North American power grid is being stretched to capacity. Consequently, it can be the case that brown outs and black outs may start chain reactions in the power grid that result in loss of reliable power. Also, a significant change in one load can have a negative effect in another load as a power distribution network struggles to adjust to such changes.

Further, output from generators is generally adjusted in accordance with changes in the load. For significant changes in a load that are near instantaneous, the power distribution network might have difficulty adjusting the generator output fast enough to accord with the new load conditions, causing power sags, surges, and other electrical anomalies in the network. There are many different effects that load swings and other changes in electrical loads can have on a power distribution network as can be appreciated.

In addition, the nature of current power distribution networks typically requires that primary power sources such as large electrical generating stations have to supply a significant percentage such as around 75% of the power on the power distribution network in order to maintain frequency synchronization among the various power sources coupled to the power distribution network. This can be problematic where lesser generating sources such as so called "green" sources such as windmill farms, solar farms, and other sources are brought online. In particular, the amount of power that can be produced by such sources is limited so as to be able to maintain frequency synchronization on the power distribution network.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

The various embodiments of the present invention include the use of power multipliers as described in U.S. Utility patent application Ser. No. 11/069,476 entitled, "ELECTRICAL POWER MULTIPLICATION," filed on Mar. 1, 2005; U.S. Utility patent application Ser. No. 11/069,682 entitled, "USE OF ELECTRICAL POWER MULTIPLICATION FOR POWER SMOOTHING IN POWER DISTRIBUTION," filed on Mar. 1, 2005; U.S. Utility patent application Ser. No. 11/670,620 entitled, "PARAMETRIC POWER MULTIPLICATION," filed on Feb. 2, 2007; and U.S. Utility patent application Ser. No. 11/697,014 entitled "ELECTRIC POWER STORAGE," filed on Apr. 5, 2007, where each of these applications is incorporated herein by reference in their entirety. The power multipliers as described herein may be constructed from lumped elements or distributed elements as set forth in the above described U.S. patent applications. For purposes of the discussion herein, one embodiment of a power multiplier is described herein that is constructed from lumped elements. However, it is understood that in other embodiments of the present invention, power multipliers may be employed that are constructed of distributed elements, or a combination of both lumped and distributed elements. In addition, the power multipliers described herein may include parametric elements as described in U.S. Utility patent application Ser. No. 11/670,620 entitled, "PARAMETRIC POWER MULTIPLICATION," filed on Feb. 2, 2007 referenced above.

Figure 1:
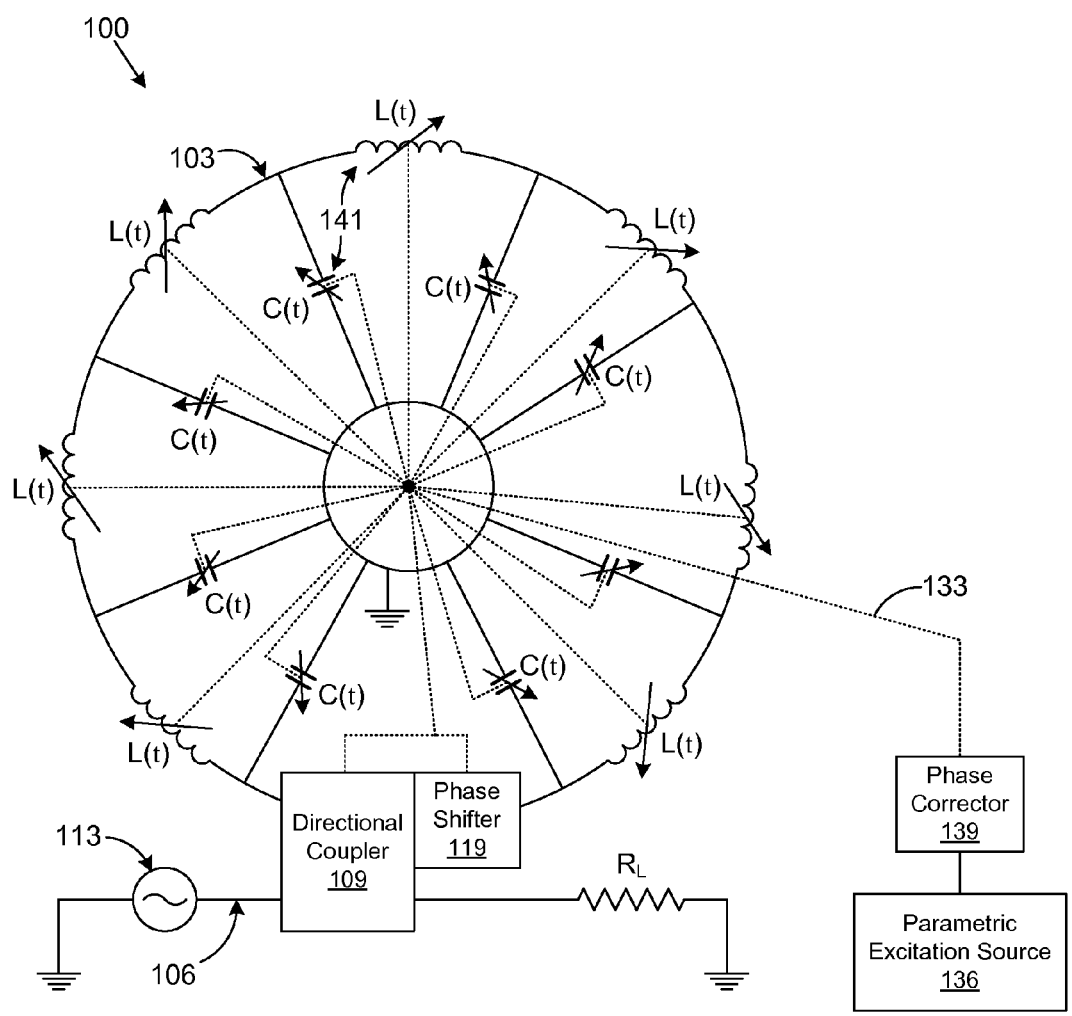
FIG. 1 is a schematic of a power multiplier that employs parametric excitation according to an embodiment of the present invention.

Turning then, to FIG. 1, shown is one example of a power multiplier 100 that may be employed according to the various embodiments of the present invention. The power multiplier 100 provides one example of the various power multipliers described in U.S. Utility patent application Ser. No. 11/069,476 entitled, "ELECTRICAL POWER MULTIPLICATION," filed on Mar. 1, 2005; U.S. Utility patent application Ser. No. 11/069,682 entitled, "USE OF ELECTRICAL POWER MULTIPLICATION FOR POWER SMOOTHING IN POWER DISTRIBUTION," filed on Mar. 1, 2005; and U.S. Utility patent application Ser. No. 11/670,620 entitled, "PARAMETRIC POWER MULTIPLICATION," filed on Feb. 2, 2007, that may also be employed herein. Since the various embodiments of power multipliers are discussed fully in these applications incorporated herein by reference, they will not be further discussed in significant detail herein.

The power multiplier 100 employs parametric excitation and includes a power multiplying network 103 and a launching network 106. The launching network 106 is coupled to the power multiplying network 103 via a directional coupler 109 that couples the launching network 106 to the power multiplying network 103. A power source 113 is coupled to the launching network 106. Also, the launching network 106 is terminated in a matching load $R_L$. While a power launching network 106 is shown, it is understood that other circuitry may be employed to couple a power source or a load to a power multiplying network such as the power multiplying network 100 as will be discussed.

According to one embodiment, the power multiplying network 103 is a multiply-connected electrical structure. The multi-connected electrical structure may comprise, for example, a velocity inhibiting circuit constructed from a number of lumped-elements. As contemplated herein, the term "network" refers to an interconnected structure of electrical elements. The terms "multiply-connected" are mathematical terms relating to the existence of a closed path in a resonator, waveguide, or other electrical structure that cannot be reduced to a point without part of the closed path passing through regions that are external to the geometrical boundaries of the resonator, waveguide, or other electrical pathway. The power multiplying network 103 is "velocity inhibiting" as the electrical structure of the power multiplying network 103 results in a reduced velocity of propagation of an electromagnetic wave through the power multiplying network 103 relative to the speed of an electromagnetic wave through free space, which is the speed of light.

In addition, the term "lumped" refers to elements that are effectively concentrated at a single location. Thus, the terms "lumped-elements" refer to discrete, two-terminal, concentrated electrical elements such as capacitance, inductances, resistance, and/or conductance. Thus, the lumped-elements as described herein may comprise discrete inductors, capacitors, or resistors. In addition, as contemplated herein, lumped-elements may also comprise diodes, transistors, and other semi-conductors that may be described, for example, as nonlinear resistors or conductors that have resistance or conductance that is controlled by the polarity of applied voltages or currents, etc.

In addition, lumped-elements may also comprise inherent capacitances, inductances, resistances, or conductances of various electrical structures such as helices, parallel plates, or other structures as will be discussed. Similar to the power multiplying network 103, the directional coupler 109 may also be constructed using lumped-elements. Thus, the power multiplying network 103 provides one example of a multiply-connected circuit that may comprise, for example, a circuit formed in a ring. Alternatively, according to other embodiments, a power multiplier may be constructed out of distributed element components formed in a multiply-connected electrical structure such as a ring. For example, an alternative multiply-connected electrical structure may comprise a loop of coaxial cable or other similar structure.

According to one embodiment, the power multiplying network 103 is a velocity inhibiting circuit that results in a slower velocity of propagation of an electrical disturbance such as a traveling wave. In this respect, the power multiplying network 103 has an electrical length that is equal to an integer multiple of the wavelength of the operating frequency of the power source 113. Due to the velocity inhibited nature of the power multiplying network 103, its size is quite compact in comparison with the wavelength of the operating frequency of the power source 113. In addition, the directional coupler 109 causes a phase shift that is equal to one quarter of the wavelength of an exciting traveling wave generated by the power source 113 at the operating frequency. As will be described below, the directional coupler 109 provides one example of a circuit that may be employed to couple a power source 113 to the power multiplying network 103.

The power multiplier 100 also includes a phase shifter 119 as shown. The phase shifter 119 comprises, for example, a circuit constructed from lumped-elements that is combined in series with a portion of the directional coupler 109 to make up an inductance $L(t)$ of the specific section within which the directional coupler 109 is located.

In one embodiment, the power multiplying network 103 is constructed from lumped-elements such as, for example, parametric reactances that include variable inductances $L(t)$ and variable capacitances $C(t)$. Common examples of time-varying or parametric reactances are inductors and capacitors whose permittivity and permeability functions are pumped in time by a control voltage or current. Similarly, distributed time-varying impedances have their constitutive parameters pumped by a control signal, which may be electrical, electromagnetic, optical, thermal, mechanical, acoustical, etc. For a more detailed discussion of the parametric reactances comprising the variable inductances $L(t)$ and variable capacitances $C(t)$, reference is made to the discussion in the co-pending U.S. patent application Ser. No. 11/670,620 entitled, "PARAMETRIC POWER MULTIPLICATION," filed on Feb. 2, 2007 and incorporated by reference above.

According to the various embodiments, one or more of the parametric reactances in the power multiplying network 103 are varied in time at a frequency that is in a predefined relationship relative to the operating frequency of the power source 113. That is to say, the frequency of at which the parametric reactances are varied in time is in a predefined relationship relative to the frequency of a traveling wave in the ring formed by the power multiplying network 103. In one example, the frequency at which the parametric reactances are varied is twice the operating frequency of the power source 113 and the power multiplying network 103. For a more specific discussion as to the relationship between the frequency of the power source 113 and the frequency at which the parametric reactances are varied, reference is made once again to U.S. patent application Ser. No. 11/670,620 entitled, "PARAMETRIC POWER MULTIPLICATION," filed on Feb. 2, 2007 and incorporated by reference above.

According to one embodiment, the parametric reactances $L(t)$ and $C(t)$ are varied based upon a parametric excitation output or signal 133. The parametric excitation signal/output may be generated in any one of a number of ways. In one embodiment, the parametric excitation output 133 is generated by a parametric excitation source 136. In one embodiment, the parametric excitation output 133 generated by the parametric excitation source 136 is applied to a phase corrector 139. The phase corrector 139 provides for the adjustment of the phase of the parametric excitation output 133 so as to align properly with the traveling wave in the power multiplying network 103, thereby resulting in parametric gain as was described in U.S. patent application Ser. No. 11/670,620 entitled, "PARAMETRIC POWER MULTIPLICATION," filed on Feb. 2, 2007 and incorporated by reference above. The parametric excitation source 136 may comprise, for example, a generator, a DC power source such as a DC battery, fuel cells, solar panels, or other DC power source coupled to an oscillator, etc.

By virtue of the appropriate variation of the parametric reactances as set forth above, a negative resistance is created in the multiply-connected electrical structure that negates at least a portion of a physical resistance of the multiply-connected electrical structure. For a more detailed discussion of the frequency of the parametric excitation output 133 and the creation of a negative resistance in the multiply-connected electrical structure, references is made once again to U.S. patent application Ser. No. 11/670,620 entitled, "PARAMETRIC POWER MULTIPLICATION," filed on Feb. 2, 2007.

If the magnitude of the parametric excitation output 133 is great enough, then substantially the entire physical resistance of the multiply-connected electrical structure may be negated such that the multiply-connected electrical structure either approaches superconductivity or becomes superconductive. Thus, by applying the parametric excitation output 133 to the parametric reactances in the multiply-connected electrical structure, the physical resistance of the multiply connected electrical structure is reduced or eliminated. This reduces or eliminates the loss of electrical energy traveling through the multiply-connected electrical structure due to the physical resistance of the multiply-connected electrical structure. As a result, it may be possible to store massive amounts of electrical energy in the multiply-connected electrical structure with little loss. Also, electrical energy may flow through the multiply-connected electrical structure with little or no loss when the power multiplier is used in a power distribution capacity as will be described.

Given that the effective resistance of the multiply-connected electrical structure can be reduced to zero or near zero, then it would be possible to build up massive amounts of electrical energy in the multiply-connected electrical structure. Once the electrical energy is built up to the desired level, it can then be maintained in the structure with little or no loss over long periods of time simply by applying an appropriate parametric excitation output 133 to the respective parametric reactances of the multiply-connected electrical structure.

The amount of electrical energy that may be stored within a given multiply-connected electrical structure may depend upon the physical limits of the structure in that, as voltages increase, the possibility of arcing and other phenomena increase as well. Thus, the physical limitations of the structure may dictate the ultimate maximum energy storage capacity of a given multiply-connected electrical structure. As such, the ultimate capacity of the multiply-connected electrical structure is design specific.

With the forgoing discussion of power multipliers in mind, we proceed with the discussion of the use of power multipliers for power distribution in a power distribution network. According to one embodiment, such a power distribution network may comprise, for example, the North American power grid or other power grid.

Figure 2:
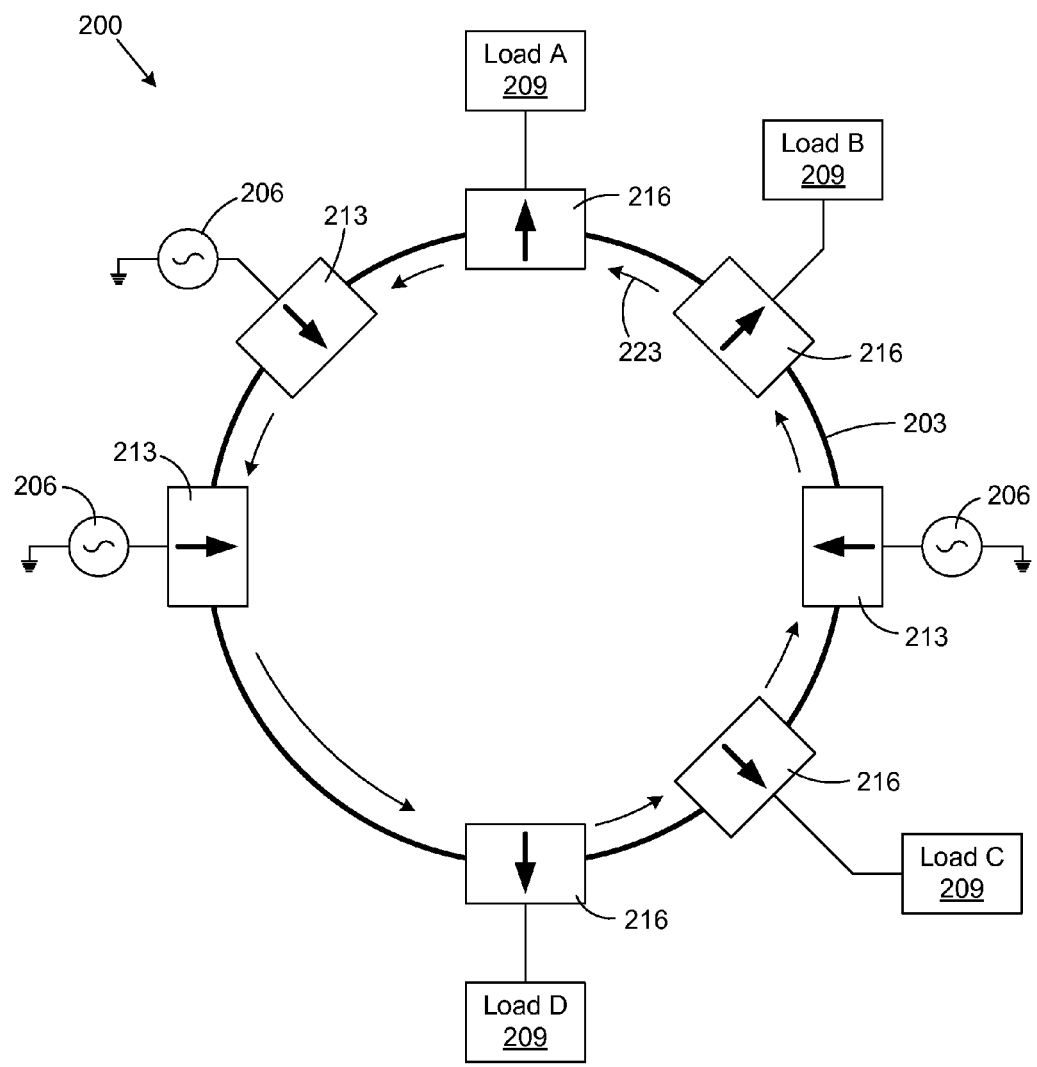
FIG. 2 is a schematic block diagram of a power distribution network according to an embodiment of the present invention.

Referring next to FIG. 2, shown is a schematic block diagram of a power distribution network 200 according to an embodiment of the present invention. The power distribution network 200 includes a power multiplier that comprises a multiply-connected electrical structure 203. The multiply-connected electrical structure 203 may comprise, for example, a power multiplying network as described above.

The power distribution network 200 also includes a number of power sources 206 and a number of electrical loads 209. The power sources 206 may comprise, for example, Alternating Current (AC) power sources such as AC generators, solar farms, wind farms (windmills) or other AC power sources, as can be appreciated. The electrical loads 209 may comprise electrical loads as are typical on a power distribution network such as, for example, the North American Power Grid, as can be appreciated.

Each of the power sources 206 and the electrical loads 209 are coupled to the multiply-connected electrical structure 203 by virtue of a plurality of power network couplings. The power network couplings may comprise, for example, power source couplings 213 and/or load couplings 216. The power source couplings 213 may comprise, for example, a directional coupler 109 as was described above that are designed to couple most of the power generated by the power sources 206 into the multiply-connected electrical structure 203. The load coupling 216 is a circuit that provides for diversion of electrical energy stored in the multiply-connected electrical structure 203 to the loads 209, as will be described.

The power distribution network 200 may comprise, for example, a portion of an electrical grid such as, for example, the North American power grid, as can be appreciated. The electrical loads 209 may comprise, for example, various municipalities or rural areas, etc., which are supplied power through substations or other electrical structures, as can be appreciated. As employed in the power distribution network 200, the multiply-connected electrical structure 203 acts as a node in the power distribution network 200 that facilitates distribution of power generated by the power sources 206 to the electrical loads 209.

Specifically, the power sources 206 generate electrical power that enters the multiply-connected electrical structure 203 through the power source couplings 213. The power source couplings 213 are directional couplers such that the power signal enters and flows through the multiply-connected electrical structure 203 in a single direction 223. Also, power does not flow out of the multiply-connected electrical structure 203 back to the power sources 206 through the power source couplings 213.

The load couplings 216 control the amount of power that is diverted from the multiply-connected electrical structure 203 to a given load 209. Where the multiply-connected electrical structure 203 is constructed from parametric reactances, the electrical energy that is directed into the multiply-connected electrical structure 203 can be maintained therein with little or no loss, as described above.

Generally, when the power distribution network 200 is in equilibrium, the amount of power generated by the power sources 206 and directed into the multiply-connected electrical structure 203 through the respective power source couplings 213 is substantially equal to the amount of power diverted from the multiply-connected electrical structure 203 to the respective loads 209 through the load couplings 216. While such equilibrium between supply and demand of electrical power is preferable, it is often the case that fluctuations in either the loads 209 or in the generating capacity of the power sources 206 may occur that cause a mismatch between the power generated by the power sources 206 and the power attenuated in the loads 209.

For example, an electrical load might experience a significant swing, such as moving from a low load state to a high load state due to the fact that large electrical equipment was suddenly powered up or added to the power distribution network. Such a load swing might be near instantaneous, or may occur over time. Where a swing in an electrical load is near instantaneous, then the output of the power generators is preferably increased to provide the appropriate amount of power to the new load.

It would be preferable if the power generators could increase simultaneously with the change in the loads. However, such is typically not the case, given that, for example, generators typically cannot increase or decrease their power output as quickly as loads can change.

In conventional power distribution networks, violent load swings in various loads can detrimentally affect the power supplied to other loads. Specifically, for example, where a given load moves near instantaneously from a low load state to a high load state, other loads coupled nearby might experience a temporary sag or other anomalies until the generators are adjusted so as to provide power for the new load experience.

In addition, in conventional networks, other problems abound. For example, it is typically the case that harmonics are generated in a power distribution network that can damage electrical components on the network. For example, harmonics on a given power distribution network might be attenuated in transformers or other components on the network, thereby generating heat in such components. Such heat can significantly reduce the life span of such components.

Furthermore, in order to maintain synchronization among the various power sources on a given power distribution network, it is typically the case that a primary electrical source generates a primary power signal that serves as a voltage and phase reference for lesser power sources. For example, primary power sources may comprise large electrical generating stations consisting of generators propelled by steam turbines driven by steam produced in very large coal fired boilers. Lesser power sources may comprise, for example, gas turbine generators, solar farms, wind farms, and other "green" sources that are beginning to proliferate given concerns for carbon dioxide emissions that potentially translate into global warming.

Conventionally, the percentage of power generated by secondary generation sources is typically required to be less than or equal to approximately 25% of the total power generated on the network. This is because the primary electrical generation sources act as a frequency and phase reference with which other power sources on the network can be synchronized for effective power distribution. Unfortunately, this can limit the number of secondary power sources such as "green" power sources (i.e. solar farms or wind farms) that may be coupled to a given power distribution network.

According to the various embodiments of the present invention, the power distribution network 200 that employs the multiply-connected electrical structure 203 provides significant advantages in that the above problems and other problems not discussed herein are at least partially solved.

First, the power source couplings 213 are directional couplers that cause power from the power sources 206 to propagate through the multiply-connected electrical structure 203 in a single direction 223 as described above. Power does not flow in the reverse direction or back to the power sources 206. As a result, each of the power sources 206 is electrically isolated from each other. When one of the power sources 206 supplies power to the multiply-connected electrical structure 203, there is little or no effect on the other power sources 206. As contemplated herein, the terms "electrical isolation" refer to the buffering provided by the directional couplers and load couplers.

In a case where the power diverted to the loads 209 through the respective load couplings 216 is less than the amount of power supplied to the multiply-connected electrical structure 203 by the power sources 206 through the power source couplings 213, electrical energy builds up in the multiply-connected electrical structure 203 and is stored for future use. According to one embodiment, a control system may be employed to ensure that a maximum amount of power is stored in the multiply-connected electrical structure 203. Where the amount of electrical energy stored in the multiply-connected electrical structure 203 exceeds a given threshold, a control system may be employed to divert a portion of the power in the multiply-connected electrical structure 203 to additional loads that are switched into the multiply-connected electrical structure 203 for such attenuation purposes.

In addition, the electrical loads 209 are electrically isolated from the power sources 206. In particular, the power sources 206 are effectively "decoupled" from the loads 209. Specifically, where load swings occur in respective one of the loads 209, the power stored in the multiply-connected electrical structure 203 may supply needed power in a given instant, thereby allowing the power sources 206 time to "catch up" with the fluctuations in the loads 209. In such case, the power sources 206 are controlled to supply more or less power as is needed, depending on the behavior of the loads 209.

To explain further, where a load 209 transitions either substantially instantaneously or slowly from a high load state to a low load state, one or more of the power sources 206 may suddenly be supplying too much power to the multiply-connected electrical structure 203, such that equilibrium is no longer maintained between the amount of power generated and the amount of power consumed. The multiply-connected electrical structure 203 can store the excess power generated by the one or more power sources 206 until appropriate control systems cause the respective one or more power sources 206 to generate less power such that equilibrium in the power distribution network 200 is reestablished.

Alternatively, where a load 209 transitions from a low load state to a high load state, ultimately the loads 209 on the multiply-connected electrical structure 203 may require more power than is supplied by the power sources 203. In such a case, the electrical energy stored in the multiply-connected electrical structure 203 can be diverted to the respective load 209 to compensate for the increased demand until one or more of the power sources 206 can be controlled to increase the amount of power directed into the multiply-connected electrical structure 203 to reestablish equilibrium between the power generated and the power consumed.

Thus, electrical isolation in this sense refers to the ability of the power source couplings 213 and the load couplings 216 to prevent the power sources 206 from seeing the full effect of a change in the electrical loads 209. As an example, let us say that one of the electrical loads 209 changed from some steady state value of finite resistance to an open-circuit. The sudden removal of an electrical load 209 may cause one or more power sources 203 to surge, and, if not brought under control in time, may self-destruct. With the use of the couplers 213 and 216, the maximum change in load resistance even with a complete unloading to an open-circuit will be approximately a 10% rise, for example, in the load resistance as seen by a respective power source 206.

As a result, the power sources 206 are prevented from experiencing the full fluctuations in the load 209 that may result in degradation of the power sources 206 over time. For example, electrical generators might be prevented from feeling physical stress due to fluctuations in the load 209 at a given instant. Also, due to the ability of the multiply-connected electrical structure 203 to store or supply power as needed, the loads 209 are prevented from experiencing undervoltages and overvoltages.

In addition, the multiply-connected electrical structure 203 effectively electrically isolates the loads 209 from each other. For example, if a given load swings violently from a high load state to a low load state, the other loads in a conventional power distribution network might experience power surges or sags as the power distribution network seeks to achieve equilibrium by controlling the amount of power generated, etc. However, the power stored within the multiply-connected electrical structure 203 at any given instant may be used to supply power to a load 209 where a sudden increase in demand for power is experienced without affecting the power supplied to other loads coupled thereto.

Thus, the multiply-connected electrical structure 203 can act as an energy buffer that provides for electrical isolation between the power sources 206 and the loads 209 coupled thereto. To this end, the multiply-connected electrical structure 203 electrically isolates all components coupled thereto from each other.

In addition, as set forth above, the power source couplings 213 are effectively one-way couplings that facilitate the propagation of the electrical energy in the multiply-connected electrical structure 203 in a single direction as will be described. The resulting electrical isolation provided by the multiply-connected electrical structure 203 means that it is advantageously configured to be employed as a frequency and phase reference to allow the frequency and phase synchronization between the respective power sources 206, regardless of whether they are primary or secondary power sources 206.

For example, the amount of power generated by secondary power sources such as "green" sources, can be greater than 25% of the total power generated on the power distribution network 200. Thus, the multiply-connected electrical structure 203 facilitates the proliferation of secondary sources that can reduce the amount of greenhouse gases such as carbon dioxide emitted into the atmosphere.

In order to provide for frequency and phase synchronization, at least one of the sources 206 is designated a primary source upon startup, for example, where a blackout condition exists in the power distribution network 200. This primary power source 206 may be employed to build up power in or "prime" the multiply-connected electrical structure 203. Once a sufficient amount of power propagates through the multiply-connected electrical structure 203, then the remaining power sources 206 may be brought online and synchronized in frequency and phase with the power signal propagating through the multiply-connected electrical structure 203.

In addition, given the fact that the multiply-connected electrical structure 203 facilitates storage of power, the loads 209 may be brought online and the power sources 206 may be controlled to provide additional power as per each load 209 that is switched online in a smooth transition, where excess power stored in the multiply-connected electrical structure 203 can supply newly added loads 209 and allow generator to be controlled to supply incrementally greater amounts of power in an elegant manner.

In addition, the multiply-connected electrical structure 203 is a resonant circuit that is tuned to the nominal frequency of the power distribution network 200. Given that the multiply-connected electrical structure 203 is a resonant circuit, it thus acts as a narrow band pass filter at the resonant frequency. The resonant frequency may be, for example, 50 Hz., 60 Hz., or other frequency as can be appreciated. As a consequence, harmonics that may be generated in the power distribution network 200 that are directed into the multiply-connected electrical structure 203 are attenuated in the multiply-connected electrical structure 203.

Given that the multiply-connected electrical structure 203 is a resonant circuit tuned to the nominal frequency of the power distribution network 200, the multiply-connected electrical structure 203 acts as a narrow band pass filter and attenuates the harmonics in the various components of the multiply-connected electrical structure 203. The attenuation of such harmonics or other signals typically causes the generation of heat as is the case, for example, with transformers and other device on a power distribution network. The multiply-connected electrical structure 203 can be employed to attenuate harmonics, voltage transients, and other electrical anomalies experienced in the power distribution network 200.

Such is much better than allowing harmonics, transients, and other electrical anomalies to be attenuated in other components on a given power distribution network such as transformers, or other equipment, thereby resulting in the heating of such components causing damage and premature failure in such equipment. Thus, use of the resonant multiply-connected electrical structure 203 results in an increase in the life span of other components in the power distribution network 200 such as transformers, capacitors, and other devices by reducing the amount of harmonics, transients, and other electrical anomalies experienced.

Figure 3:
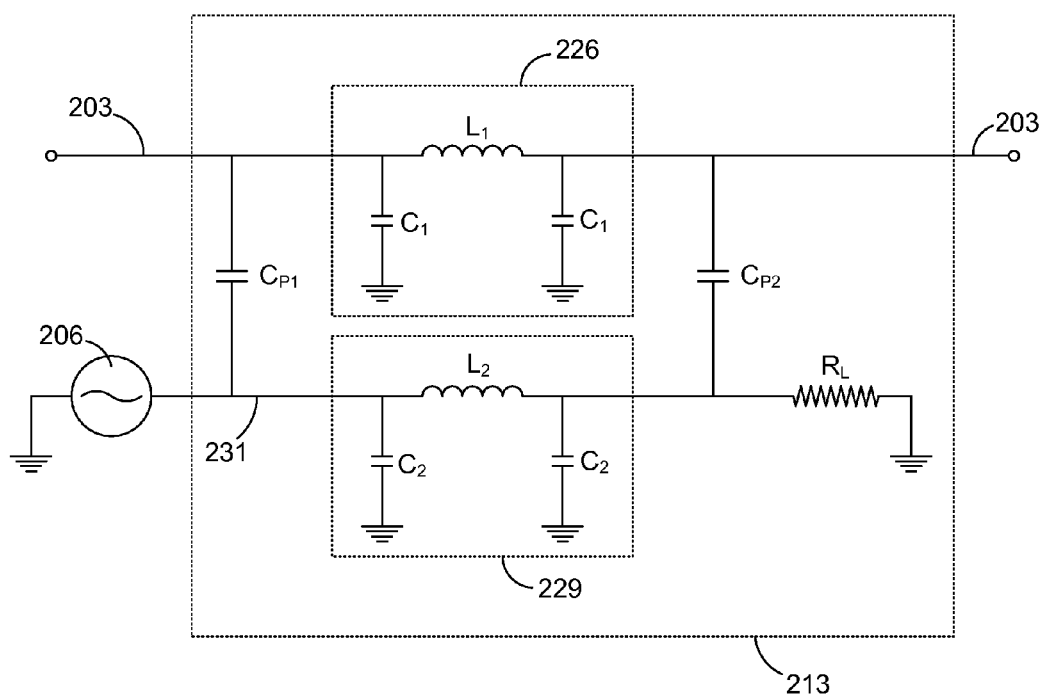
FIG. 3 is a schematic diagram of a power source coupling employed in the power distribution networks of FIG. 2 according to an embodiment of the present invention.

With reference to FIG. 3, shown is a schematic block diagram of one example of a power source coupling 213 according to an embodiment of the present invention. The power source coupling 213 is similar to the directional coupler 109 (FIG. 1) and includes the matching load $R_L$ as shown. Like the directional coupler 109, the power source coupling 213 includes pi-network 226 that comprises inductance $L_1$ and capacitances $C_1$ and pi-network 229 that comprises inductance $L_2$ and capacitances $C_2$. The power source coupling 213 also comprises a launching waveguide 231. Alternatively, a T-network may be used in place of the pi-networks 226 and 229.

The pi-networks 226 and 229 provide for an electrical delay in the propagation of a power signal through the multiply-connected electrical structure 203 and the launching waveguide 231. The components of the pi-networks 226 and 229 may comprise, for example, variable components where parametric excitation is employed.

The power source coupling 213 also comprises coupling capacitors $C_{P1}$ and $C_{P2}$. The coupling capacitors $C_{P1}$ and $C_{P2}$ are specified so as to maximize the percentage of power generated by the power source 206 that is directed into the multiply-connected electrical structure 203. In one embodiment, the coupling capacitors $C_{P1}$ and $C_{P2}$ may be variable in order to adjust as needed to maximize the amount of power entering the multiply-connected electrical structure 203.

The power source coupling 213 advantageously facilitates the flow of power in a single direction into the multiply-connected electrical structure 203. There is little or no power that propagates in a reverse direction back to the power source 206. This property of power source couplings 213 facilitates the electrical isolation of the power source 206 from other power sources. Power from the power sources 206 is directionally coupled into the multiply-connected electrical structure 203, and power from the multiply-connected electrical structure 203 is, in turn, directionally coupled into the loads, thus minimizing or substantially reducing the effect of instantaneous load fluctuations.

Figure 4:
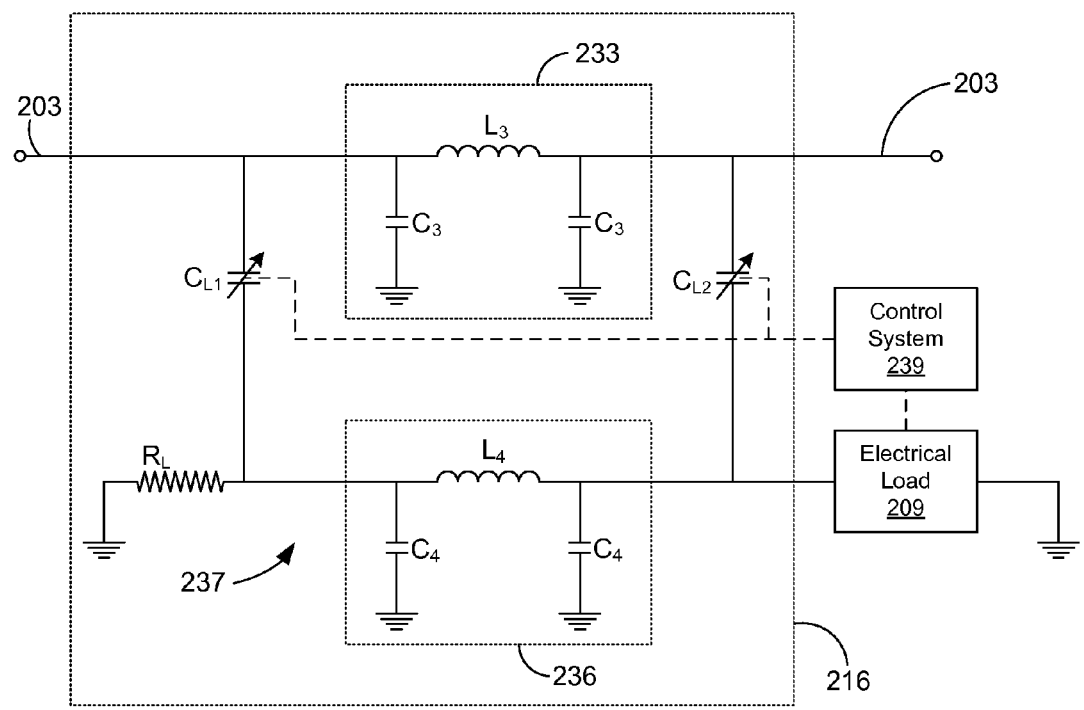
FIG. 4 is a schematic diagram of a load coupling employed in the power distribution networks of FIG. 2 according to an embodiment of the present invention.

Referring next to FIG. 4, shown is a schematic block diagram of one example of a load coupling 216 according to an embodiment of the present invention. The load coupling 216 may be viewed as the reciprocal of the power source coupling 213 described above with respect to FIG. 3. As shown, the load coupling 216 includes a pi-network 233 that comprises an inductance $L_3$ and capacitors $C_3$, and pi-network 236 that comprises inductance $L_4$ and capacitances $C_4$. The load coupling 216 includes an off-loading waveguide 237 that directs power exiting the multiply-connected electrical structure 203 to the electrical load 209. The pi-networks 233 and 236 are designed to provide for an electrical delay in propagation of power signals through the multiply-connected electrical structure 203 and the off-loading waveguide 237. The components of the pi-network 233 may comprise, for example, dynamically varying components. Also, T-networks may be employed in place of the pi-networks 233 and 236 as can be appreciated.

In addition, the load coupling 216 includes coupling capacitors $C_{L1}$ and $C_{L2}$. The coupling capacitors $C_{L1}$ and $C_{L2}$ are variable capacitors that may be adjusted during the operation of the electrical load 209 to divert more or less power to the electrical load 209 from the multiply-connected electrical structure 203. To this end, a control system 239 is employed to monitor the electrical load 209 and control the value of the variable coupling capacitances $C_{L1}$ and $C_{L2}$ in order to control the amount of power that flows out of the multiply-connected electrical structure 203 to the electrical load 209 based upon the demands of the electrical load 209 at a given instant.

The load coupling 216 is directional in nature in that power is coupled to the electrical load 209 through the coupling capacitors $C_{L1}$ and $C_{L2}$ and little or no power flows in the reverse direction. This fact provides for the electrical isolation of the electrical load 209 from the remaining electrical loads 209 and power sources 206 coupled to the multiply-connected electrical structure 203 as described above. If the electrical load 209 were suddenly switched from a steady-state resistance to an open circuit, for example, the power applied to the electrical load 209 would be redirected through the matching resistance $R_L$ until corrective action is taken such as adjustment of the variable coupling capacitances $C_{L1}$ and $C_{L2}$ or mechanical removal of the load coupling 216 from the multiply-connected electrical structure 203. This protective action by the load coupler 216 is for practical purposes instantaneous. It is done completely with passive components, no transistors or mechanical switches are required.

In addition, the control system 236 might provide feedback to one or more of the power sources 206 to cause the power sources to supply more or less power to the multiply-connected electrical structure 203 in response to changes in the electrical load 209. In this respect, the electrical isolation offered by the multiply-connected electrical structure 203 ensures that the power distribution network 200 is maintained in equilibrium as much as possible with minimal stress on components. Such results in increased longevity of network components and reduced power outages due to a loss of components such as transformers, etc.

It should be emphasized that the above-described embodiments of the present invention are merely possible examples of implementations, merely set forth for a clear understanding of the principles of the various embodiments of the present invention. Many variations and modifications may be made to the above-described embodiment(s) of the invention without departing substantially from the spirit and principles of the various embodiments of the invention. All such modifications and variations are intended to be included herein protected by the following claims.

Therefore, having thus described the invention, at least the following is claimed:

1. A power distribution apparatus, comprising:
   a power multiplier comprising a multiply-connected electrical structure;
   a plurality of power network couplings in the multiply-connected electrical structure; and
   a plurality of power sources, each power source electrically coupled to a respective power network coupling;
   wherein the multiply-connected electrical structure is a resonant circuit tuned to a nominal frequency of a power network and is configured to maintain a power signal that acts as a frequency and phase reference for purposes of synchronization for the plurality of power sources.

2. The power distribution apparatus of claim 1, wherein the multiply-connected electrical structure further comprises a parametric reactance that negates at least a portion of a physical resistance of the multiply-connected electrical structure.

3. The power distribution apparatus of claim 1, wherein the multiply-connected electrical structure stores electrical energy received through one of the power network couplings.

4. The power distribution apparatus of claim 1, wherein the multiply-connected electrical structure is a velocity inhibited circuit.

5. The power distribution apparatus of claim 4, wherein the multiply-connected electrical structure is constructed from a plurality of lumped-elements.

6. The power distribution apparatus of claim 1, wherein:
   at least one power source is electrically coupled to a first one of the power network couplings;
   at least one electrical load is electrically coupled to a second one of the power network couplings; and
   the multiply-connected electrical structure further comprises an energy storage buffer between the at least one power source and the at least one electrical load.

7. The power distribution apparatus of claim 1, wherein the multiply-connected electrical structure provides a degree of electrical isolation between respective ones of the power network couplings.

8. The power distribution apparatus of claim 7, wherein the power network couplings further comprise a plurality of load couplings.

9. The power distribution apparatus of claim 8, wherein a first load is coupled to a first one of the load couplings and a second load is coupled to a second one of the load couplings, the multiply-connected electrical structure reducing an effect of a change in the first load on power supplied to the second load.

10. The power distribution apparatus of claim 7, wherein the power network couplings further comprise a plurality of power source couplings.

11. The power distribution apparatus of claim 10, wherein the degree of electrical isolation further comprises the degree of electrical isolation between a first power source coupled to a first one of the power source couplings and a second power source coupled to a second one of the power source couplings.

12. The power distribution apparatus of claim 1, further comprising:
   at least one of the power network couplings further comprising a load coupling; and
   a control system that regulates a flow of electrical energy through the load coupling to an electrical load.

13. The power distribution apparatus of claim 1, wherein the multiply-connected electrical structure acts as a narrow band pass filter at the nominal frequency.

14. The power distribution apparatus of claim 13, wherein heat removed from the multiply-connected electrical structure is generated by an attenuation of at least one waveform having a frequency outside the narrow pass band of the multiply-connected electrical structure.

15. A method for power distribution, comprising the steps of:
   supplying electrical energy from at least one power source to a power multiplier comprising a multiply-connected electrical structure comprising a resonant circuit tuned to a nominal frequency of a power network, the multiply-connected electrical structure configured to maintain a power signal that acts as a frequency and phase reference for purposes of synchronization for the at least one power source; and
   distributing the electrical energy to at least one electrical load from the multiply-connected electrical structure.

16. The method of claim 15, further comprising the step of parametrically exciting a parametric reactance in the multiply-connected electrical structure to negate at least a portion of a physical resistance of the multiply-connected electrical structure.

17. The method of claim 15, further comprising the step of storing electrical energy in the multiply-connected electrical structure.

18. The method of claim 15, further comprising the step of inhibiting a velocity of a power waveform propagating through the multiply-connected electrical structure.

19. The method of claim 18, further comprising the step of constructing the multiply-connected electrical structure from a plurality of lumped-elements.

20. The method of claim 15, further comprising the step of buffering an amount of electrical energy between the at least one power source and the at least one electrical load in the multiply-connected electrical structure.

21. The method of claim 15, further comprising the step of providing a degree of electrical isolation between the at least one power source and the at least one electrical load using the multiply-connected electrical structure.

22. The method of claim 21, wherein the at least one electrical load further comprises a plurality of electrical loads, the method further comprising the step of reducing an effect of a change in a first one of the electrical loads on power supplied to a second one of the electrical loads.

23. The method of claim 21, wherein the at least one power source further comprises a plurality of power sources, the method further comprising the step of providing a degree of electrical isolation between respective ones of the power sources with the multiply-connected electrical structure.

24. The method of claim 23, further comprising the step of using a power signal in the multiply-connected electrical structure as a frequency and phase reference for purposes of synchronization of at least one of the power sources.

25. The method of claim 24, further comprising the step of employing one of the power sources to prime the power signal in the multiply-connected electrical structure at startup.

26. The method of claim 15, wherein the step of distributing the electrical energy to at least one electrical load from the multiply-connected electrical structure further comprises the step of controlling a flow of the electrical energy from the multiply-connected electrical structure to the at least one electrical load.

27. The method of claim 15, wherein the multiply-connected electrical structure acts as a narrow band pass filter at the nominal frequency, wherein the method further comprising the step of electrically filtering power flowing through the multiply-connected electrical structure, where an amount of heat is generated in the multiply-connected electrical structure by an attenuation of at least one waveform having a frequency outside the narrow pass band of the multiply-connected electrical structure.

28. A power distribution apparatus, comprising:
a power multiplier comprising a multiply-connected electrical structure comprising a parametric reactance that negates at least a portion of a physical resistance of the multiply-connected electrical structure;
a plurality of power network couplings in the multiply-connected electrical structure; and
wherein the multiply-connected electrical structure is a resonant circuit tuned to a nominal frequency of a power network.

29. A power distribution apparatus, comprising:
a power multiplier comprising a multiply-connected electrical structure;
a plurality of power network couplings in the multiply-connected electrical structure, the plurality of power network couplings further comprise a plurality of load couplings; and
wherein the multiply-connected electrical structure is a resonant circuit tuned to a nominal frequency of a power network and provides a degree of electrical isolation between respective ones of the power network couplings, wherein a first load is coupled to a first one of the load couplings and a second load is coupled to a second one of the load couplings, the multiply-connected electrical structure reducing an effect of a change in the first load on power supplied to the second load.

30. A power distribution apparatus, comprising:
a power multiplier comprising a multiply-connected electrical structure;
a plurality of power network couplings in the multiply-connected electrical structure; and
wherein the multiply-connected electrical structure is a resonant circuit tuned to a nominal frequency of a power network and acts as a narrow band pass filter at the nominal frequency, wherein heat removed from the multiply-connected electrical structure is generated by an attenuation of at least one waveform having a frequency outside the narrow pass band of the multiply-connected electrical structure.

31. A method for power distribution, comprising the steps of:
supplying electrical energy from at least one power source to a power multiplier comprising a multiply-connected electrical structure comprising a resonant circuit tuned to a nominal frequency of a power network;
parametrically exciting a parametric reactance in the multiply-connected electrical structure to negate at least a portion of a physical resistance of the multiply-connected electrical structure; and
distributing the electrical energy to at least one electrical load from the multiply-connected electrical structure.

32. A method for power distribution, comprising the steps of:
supplying electrical energy from at least one power source to a power multiplier comprising a multiply-connected electrical structure comprising a resonant circuit tuned to a nominal frequency of a power network;
distributing the electrical energy to a plurality of electrical loads from the multiply-connected electrical structure;
providing a degree of electrical isolation between the at least one power source and the plurality of electrical loads using the multiply-connected electrical structure; and
reducing an effect of a change in a first one of the plurality of electrical loads on power supplied to a second one of the plurality of electrical loads.

33. A method for power distribution, comprising the steps of:
- supplying electrical energy from at least one power source to a power multiplier comprising a multiply-connected electrical structure comprising a resonant circuit tuned to a nominal frequency of a power network, wherein the multiply-connected electrical structure acts as a narrow band pass filter at the nominal frequency;
- electrically filtering power flowing through the multiply-connected electrical structure, where an amount of heat is generated in the multiply-connected electrical structure by an attenuation of at least one waveform having a frequency outside the narrow pass band of the multiply-connected electrical structure; and
- distributing the electrical energy to at least one electrical load from the multiply-connected electrical structure.

* * * * *